Sept. 2, 1958  G. V. PLUMLEY ET AL  2,849,758
FACED HONEYCOMB BUILDING MATERIAL
Filed April 18, 1955  3 Sheets-Sheet 1

Glenn V. Plumley
William B. Stevens
Alice M. Dudish
INVENTORS

BY
Attorneys

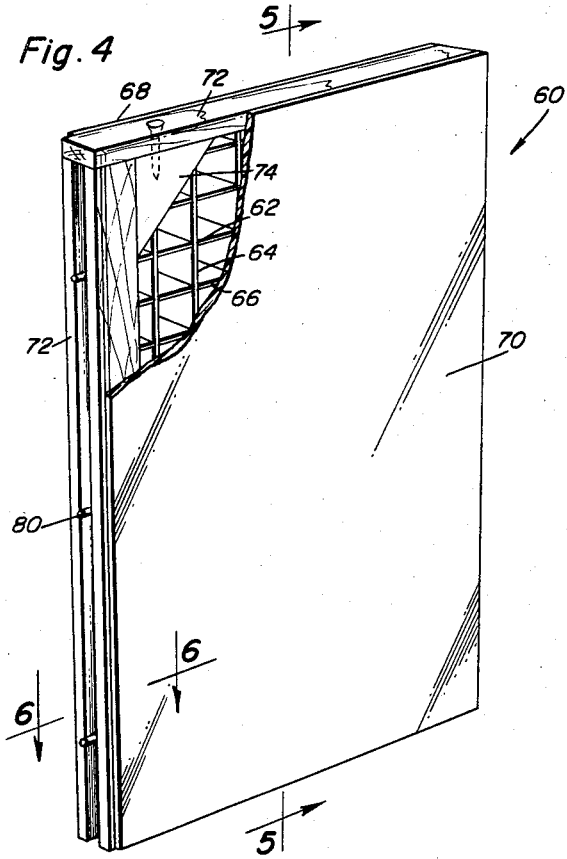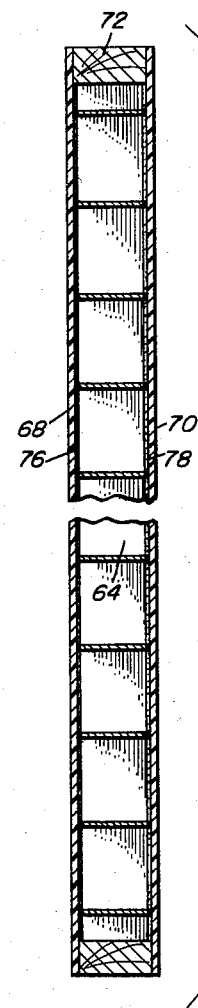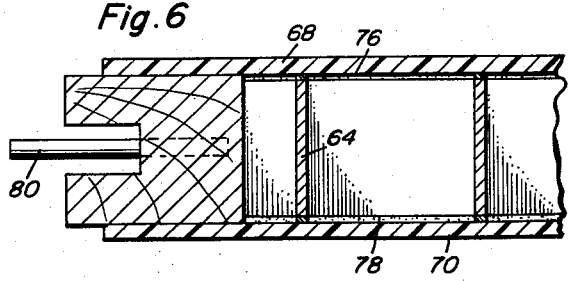

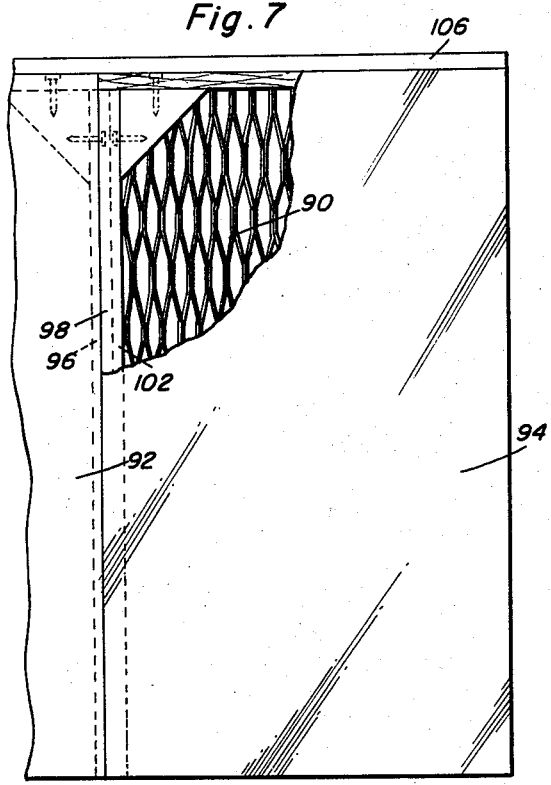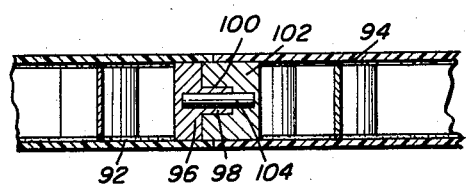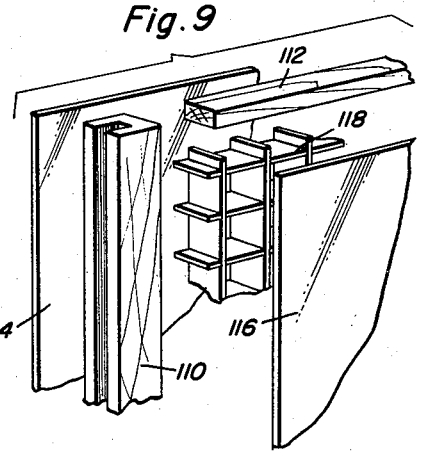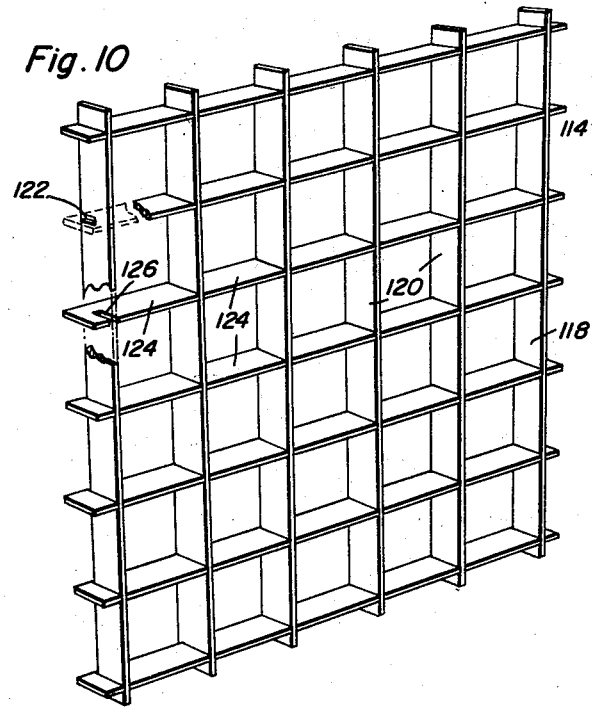
Glenn V. Plumley
William B. Stevens
Alice M. Dudish
INVENTORS _United States Patent Office_

2,849,758
Patented Sept. 2, 1958

2,849,758

FACED HONEYCOMB BUILDING MATERIAL

Glenn V. Plumley, William B. Stevens, and Alice M. Dudish, Lomita, Calif.

Application April 18, 1955, Serial No. 501,966

1 Claim. (Cl. 20—15)

This invention relates generally to building construction, and more particularly to a novel building material adapted to be used in erecting various types of buildings and structures.

The primary object of the present invention resides in the provision of a faced honeycomb building material which is strong enough structurally for use in the erection of interior partitions or outside walls for houses, trailers, office buildings and the like, and which is highly weather-resistant.

A further object of the invention resides in the provision of a novel building material which is provided with an exterior facing of any selected color or design which is resistant to deterioration by weathering, and which is provided with an interior facing which may simulate wood grains, linens, marble, tile and the like, and which requires the use of only a damp cloth for cleansing.

An additional object of the invention resides in the provision of a faced honeycomb building panel which is provided with a novel interlocking arrangement whereby the panels can be easily erected and prevented from shifting relative to each other.

The construction of this invention features the utilization of an inner honeycomb formed of paper or a paper product which is surrounded by a peripheral frame and which has an inner facing sheet and an outer facing sheet bonded thereto.

Still further objects and features of this invention reside in the provision of a faced honeycomb building material that is simple to manufacture, inexpensive to produce, highly attractive in appearance, and which is strong and durable.

These, together with the various ancillary objects and features of the invention which will become apparent as the following description proceeds, are obtained by this faced honeycomb building material, preferred embodiments of which have been illustrated in the accompanying drawings, by way of example only, wherein:

Figure 4 is a perspective view of a modified form of the panel with portions broken away to show other portions of the panel;

Figure 5 is a vertical sectional view as taken along the plane of line 5—5 of Figure 4;

Figure 6 is a partial horizontal sectional view as taken along the plane of line 6—6 in Figure 4;

Figure 7 is an elevational view of a portion of a wall constructed from the building panels having a modified form of honeycomb;

Figure 8 is a sectional detail view showing the interlock between adjacent panels as in Figure 7;

Figure 9 is a partial perspective view of a further modified form of building panel; and Figure 10 is a perspective view of a honeycomb used in the construction of the building panels with parts of the honeycomb being broken away to show other parts with greater clarity.

Figure 1:
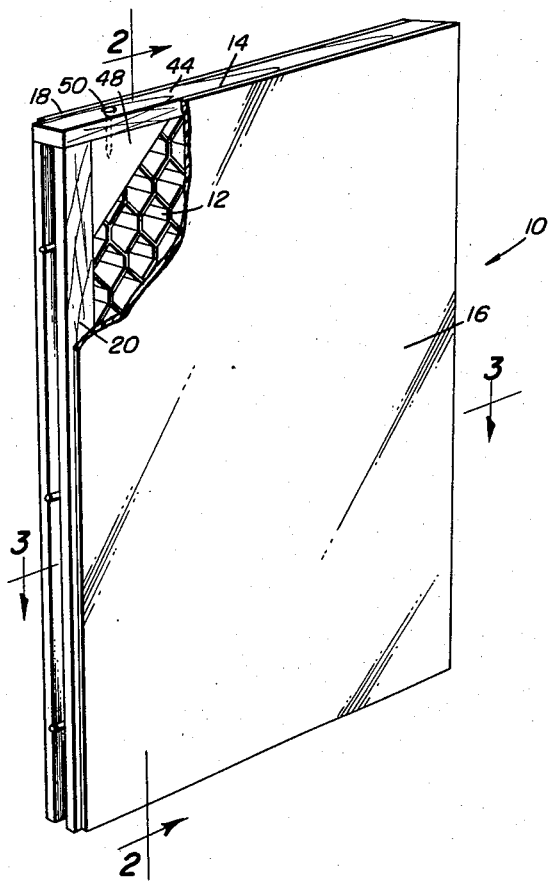
Figure 1 is a perspective view of a panel constructed in accordance with the concepts of the present invention with a portion thereof being broken away to show other portions of the panel.
Figure 2:
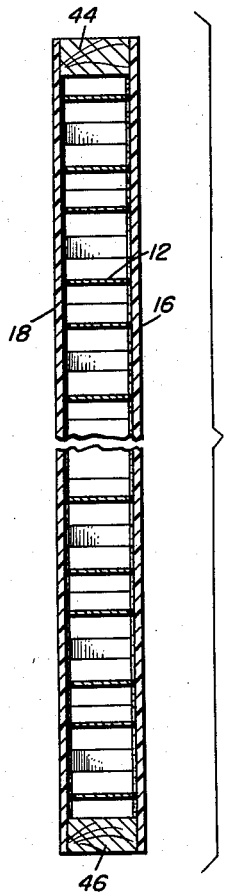
Figure 2 is an enlarged vertical sectional view as taken along the plane of line 2—2 in Figure 1.
Figure 3:
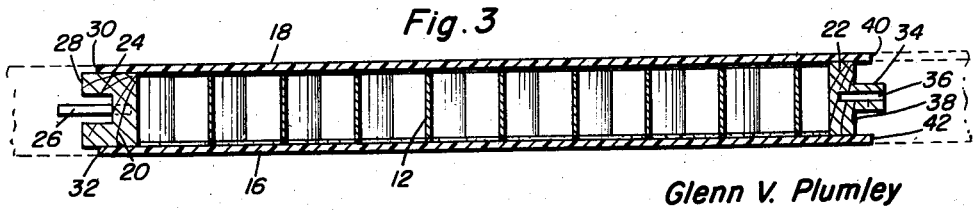
Figure 3 is an enlarged horizontal sectional view as taken along the plane of line 3—3 in Figure 1.

With continuing reference to the accompanying drawings wherein like reference numerals designate similar parts throughout the various views, and with initial attention directed to the embodiment of the invention as is shown in Figures 1 through 3, reference numeral 10 is used to generally designate a building panel constructed in accordance with the concepts of the present invention.

The building panel 10 includes a honeycomb 12 similar to that used in egg crates or the like for receiving eggs and formed of paper, cardboard or other suitable paper product. Positioned about the honeycomb 12 is a peripheral framework 14. Bonded to the honeycomb 12 and to the frame 14 is an outer facing sheet 16 formed of a resin impregnated fiber glass. This material is of sufficient strength and is generally impervious to weather, thereby rendering the entire panel comparatively inexpensive to maintain. An inner facing sheet 18 is also bonded to the honeycomb 12 by any suitable adhesive and formed generally of a synthetic plastic resin such as a combination of urea and phenolformaldehyde with a fiber binder. This synthetic plastic may be finished so as to simulate wood graining, tile, marble, linen or any other suitable ornamental and highly attractive finish which is easily cleaned by use of a damp cloth.

The frame 14 includes side frame members 20 and 22. The side frame member 20 has a vertical groove 24 therein and also has a series of dowel pins 26 embedded therein and extending outwardly therefrom. The edge, as at 28, of the side frame member 20 extends beyond the edges 30 and 32 of the inner and outer facing sheets 18 and 16, respectively.

The side frame member 22 has a projecting tongue 34 and is provided with a series of apertures 36 therein complementary to the dowel pins 26 so that dowel pins of a panel positioned adjacent thereto will seat in such apertures 36. The edge 38 of the side frame 22 extends inwardly spaced from the edges 40 and 42 of the facing sheets.

As can be seen most clearly from Figure 3, the dowel pins 26 are of materially less diameter than the width of the corresponding grooves 24 and, likewise, the recesses 36 in the tongues 34 receiving complementary dowl pins 26 are of materially less width than the width of the tongue itself so as to permit the tongue to extend along its side frame member in uninterrupted and continuous fashion. Therefore, the uninterrupted tongue cooperates with the groove 24 in interfitting relationship therewith and in conjunction with the protruding side piece 20 fitting into the recess between the end portions 40 and 42 of the panels 16 and 18 so as to provide a highly effective interlocking engagement between adjacent panels and at the same time to provide a tortuous path preventing seepage or leakage of air between adjacent panels. The interfitting engagement effected between the protruding side piece 20 and the next adjacent panel, that is, between the end portions 40 and 42 of the portions 16 and 18 of the next adjacent panel, assures a proper alignment between adjacent panels and that a smooth and uninterrupted wall surface is provided therebetween.

Positioned above and below the side frame members 20 and 22 are upper and lower frame members 44 and 46 which form limits preventing vertical movement of the panels when the tongues are interlocked with the grooves of adjacent panels. Further, corner blocks as at 48 may be provided and fasteners such as nails 50 are used to secure the side frame members and the upper and lower frame members to the corner blocks 48.

Referring now to the embodiment of the invention as is shown in Figures 4 through 6, reference numeral 60 generally designates a building panel which includes an inner honeycomb 62 constructed of alternate vertical strips 64 and horizontal strips 66 which are interlocked with each other in the conventional manner. An inner facing sheet 68 and an outer facing sheet 70 of similar materials to those forming the inner facing sheet 18 and the outer facing sheet 16 are bonded to the honeycomb 62 and a peripheral frame 72 together with corner blocks 74 similar to the frame 14 and corner blocks 48 is provided. As can be seen best in Figure 6, layers of adhesive 76, 78 are utilized to bond the panels 68 and 70 to the honeycomb 62. Dowels 80 are provided for interlocking the blocks.

In the embodiment of the invention as is shown in Figure 7, a honeycomb 90 of different shape is utilized, but the adjacent panels 92 and 94 are interlocked in the same manner as in the other embodiments of the invention. The side frame member 96 of the panel 92 has a tongue 98 which seats in the recess 100 in the side frame member 102 of the panel 94. Further, dowels 104 are provided for interlocking the panels, and the upper and lower frame members of the respective panels prevent the movement of the tongue 98 within the groove 100 in a vertical manner. Furthermore, after the panels have been arranged in abutting relationship, a beam 106 may be fastened by any suitable means thereto to complete the partition or wall.

In Figures 9 and 10, there is shown a modified construction in which a panel is composed of frame members including a side frame member 110 and a top frame member 112, the side frame member being similar to that of the side frame member 20 and there being a complementary side frame member, not shown, which is utilized in conjunction with the side frame member 10. An inner facing sheet 114 and an outer facing 116 are provided, as is a honeycomb 118. The honeycomb 118 may be composed of vertical strips 120 of pasteboard, paperboard, paper, or the like having slots, as at 122, therein. Horizontal strips 124 also of paperboard are provided and these strips may be provided with other slots 126 therein for interengagement with the slots 122 so as to form the honeycomb. In this form of the invention, no corner blocks are shown. The honeycomb is, of course, bonded between the sheets which may then be fastened to the frame members in any convenient manner.

In the utilization of the building panel having the paper honeycomb, the outer facing sheet of resin impregnated fiber glass and the inner facing sheet of thermosetting resin, such as formica, unexpectedly advantageous results are obtained due to the minimum of relative expansion and contraction of the parts because of temperature change. This prevents warpage which would destroy the bond between parts as would occur should materials such as aluminum be used for a facing sheet.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A building panel comprising an inner paper honeycomb, an outer facing sheet of resin impregnated fiber glass bonded to said honeycomb, an inner facing sheet of a synthetic plastic thermosetting resin, and a peripheral frame about said honeycomb and secured between said facing sheets, said frame including a pair of side members, a first of said pair of side members projecting beyond the side edges of said facing sheets, the second of said side members being positioned between said facing sheets and spaced from the edges of said facing sheets a distance equal to the distance said first side member projects beyond said facing sheets, the first of said side members having a vertically extending groove therein, the second of said side members having a vertical tongue projecting therefrom complementary to said groove, said tongue being continuous and uninterrupted throughout its length, said frame further including upper and lower frame members respectively overlying and underlying said side frame members, and dowel pins extending outwardly of said grooved portion of said first side member, said dowel pins being of smaller diameter than the width of said groove, said tongue having complementary apertures therein for reception of said dowel pins, and triangular corner blocks, said side frame members and said upper and lower frame members being secured to said corner blocks.

References Cited in the file of this patent

UNITED STATES PATENTS

| | | |
|---|---|---|
| 1,849,065 | Biederman | Mar. 15, 1932 |
| 2,129,441 | Otto | Sept. 6, 1938 |
| 2,477,852 | Bacon | Aug. 2, 1949 |
| 2,501,180 | Kunz | Mar. 21, 1950 |
| 2,681,483 | Morawetz | June 22, 1954 |

FOREIGN PATENTS

| | | |
|---|---|---|
| 555,484 | Great Britain | Aug. 25, 1943 |